(12) United States Patent
Braeuer

(10) Patent No.: US 7,768,896 B2
(45) Date of Patent: Aug. 3, 2010

(54) OPTICAL SCANNER WITH SYNCHRONOUS SAMPLING

(75) Inventor: Dietmar Braeuer, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 961 days.

(21) Appl. No.: 11/578,618

(22) PCT Filed: Apr. 6, 2005

(86) PCT No.: PCT/EP2005/003609

§ 371 (c)(1),
(2), (4) Date: Oct. 16, 2006

(87) PCT Pub. No.: WO2005/101390

PCT Pub. Date: Oct. 27, 2005

(65) Prior Publication Data

US 2007/0211596 A1    Sep. 13, 2007

(30) Foreign Application Priority Data

Apr. 16, 2004    (DE) .................. 10 2004 019 046

(51) Int. Cl.
*G11B 7/00*    (2006.01)

(52) U.S. Cl. .................. 369/124.04; 369/47.19
(58) Field of Classification Search .................. None
See application file for complete search history.

(56) References Cited

U.S. PATENT DOCUMENTS

| 4,817,098 A | 3/1989 | Horikawa | |
|---|---|---|---|
| 5,640,381 A * | 6/1997 | Call et al. | 369/47.52 |
| 2002/0018414 A1 | 2/2002 | Asano | |

OTHER PUBLICATIONS

Search Report Dated Jul. 25, 2005.

* cited by examiner

*Primary Examiner*—Paul Huber
(74) *Attorney, Agent, or Firm*—Robert D. Shedd; Robert B. Levy; Wan Yee Cheung

(57) ABSTRACT

The present invention relates to a scanner for optical storage media with an improved signal-to-noise ratio. In the case of an optical scanner according to the invention having a light source for generating a light beam for reading out data stored on an optical storage medium, the light source being modulated by a radio-frequency modulator, and having an analog-to-digital converter, which converts an analog data signal generated by a photodetector into a digital data signal), the radio-frequency modulator and the analog-to-digital converter are synchronized.

20 Claims, 1 Drawing Sheet

OPTICAL SCANNER WITH SYNCHRONOUS SAMPLING

This application claims the benefit, under 35 U.S.C. §365 of International Application PCT/EP05/003609, filed Apr. 6, 2005, which was published in accordance with PCT Article 21(2) on Oct. 27, 2005 in English and which claims the benefit of German patent application No. 102004019046.1, filed Apr. 16, 2004.

FIELD OF THE INVENTION

The present invention relates to a scanner for optical storage media with an improved signal-to-noise ratio, and to a device for reading and/or writing to optical storage media which uses such a scanner.

BACKGROUND OF THE INVENTION

Semiconductor lasers are usually used in devices for optical data storage. For low laser currents, a laser diode emits incoherent light. It is only when a threshold current is reached that the laser diode emits coherent light. On account of fluctuations of the current, changes in temperature or an optical feedback into the laser diode, discontinuous jumps between different wavelengths of the emitted light occur during operation. This effect is referred to as mode hopping.

The mode hops are effected in an irregular sequence, the laser diode jumping back and forth rapidly between different wavelengths. During the mode hops, the output intensity of the laser diode fluctuates within a certain scope, which leads to an increased intensity noise. In applications for optical data storage, the mode hopping caused by the optical feedback by the light beam that is focused onto the storage medium and reflected from the latter constitutes a considerable noise factor.

Radio-frequency modulators are used for improving the signal-to-noise ratio. The oscillator generates a low-noise AC current that is added to the DC current for operation of the laser diode. In this case, the DC current is chosen such that it lies just below the threshold current for laser activity, so that the laser diode is switched on and off by the AC current. This switching on and off forces the laser diode into fast mode hopping. The low-frequency component of the laser noise as a result of the mode hopping is thus shifted to high sidebands around the frequency of the radio-frequency modulator. Since the frequency ranges of such oscillators lie between 300 MHz and 500 MHz, it is possible to filter the noise as a result of mode hopping from the read and servo channel.

Since the introduction of the compact disc (CD), a large number of new formats have been established for optical storage media with higher capacities and higher read and write speeds. By way of example, the data rate of the digital versatile disc (DVD) is 11.08 Mbps. At the present time, the drive speed that is theoretically achievable mechanically is 10,000 revolutions per minute, which approximately corresponds to a 20×-DVD drive. This results in a data rate of 221.6 Mbps. A 32×-DVD drive would have a data rate of 354 Mbps. It is expected that future storage media will yield even higher data rates.

Nowadays, powerful signal processing methods are used in the reproduction path of drives for optical storage media in order to recover the data stream. A high-speed analog-to-digital converter samples the input signal of a photodetector of the optical scanner in order to feed it to the further signal processing for example by an FIR filter (finite impulse response) and a sampling rate converter for clock recovery. If the sampling rate moves into the frequency range of the radio-frequency modulator, it can happen that the laser diode is precisely switched off when the sampling is performed since, as described above, the laser diode is switched on and off by the radio-frequency modulator. An erroneous sample is determined in this case.

SUMMARY OF THE INVENTION

Therefore, it is an object of the invention to propose an optical scanner which avoids the abovementioned disadvantage and nevertheless enables a high signal-to-noise ratio.

According to the invention, this object is achieved by means of an optical scanner having a light source for generating a light beam for reading out data stored on an optical storage medium, the light source being modulated by a radio-frequency modulator, and having an analog-to-digital converter, which converts an analog data signal generated by a photodetector into a digital data signal (RF), in which the radio-frequency modulator and the analog-to-digital converter are synchronized. This ensures that the light source is always switched on during the sampling operation, so that no erroneous samples are determined. A radio-frequency modulator is usually a free-running oscillator whose frequency can be set by means of an external resistor.

The light source is advantageously pulsed by the radio-frequency modulator. This enables the abovementioned shifting of the low-frequency component of the laser noise as a result of the mode hopping to high sidebands around the frequency of the radio-frequency modulator.

A phase shifter is preferably provided, which influences the phase of the radio-frequency modulator relative to marks situated on the optical recording medium. If the phase of the radio-frequency modulator is set in such a way that transitions between marks and spaces on the optical storage medium always take place between two light pulses of the laser diode, particularly steep edges are obtained in the digital data signal, which simplifies the evaluation of the signal. The phase shifter is advantageously controlled by a microprocessor, e.g. the digital signal processor for the signal processing in the reproduction path. It goes without saying that an autonomous microprocessor may also be provided.

According to the invention, the analog data signal and/or the digital data signal are/is obtained by averaging the signals obtained from two or more pulses of the light source. The averaging reduces disturbances as a result of fluctuations of the laser power and also inadequacies of the optical storage medium or of the sampling operation, as a result of which the signal-to-noise ratio is improved further.

An optical scanner according to the invention is preferably used in a device for reading and/or writing to optical recording media. Such a device has a high signal-to-noise ratio without the abovementioned disadvantages.

BRIEF DESCRIPTION OF THE DRAWINGS

In order to afford a better understanding, the invention will be explained below with reference to FIGS. 1 to 3. Identical reference symbols designate identical elements in this case. In the figures.

DETAILED DESCRIPTION OF PREFERRED EMBODIMENTS

Figure 1:
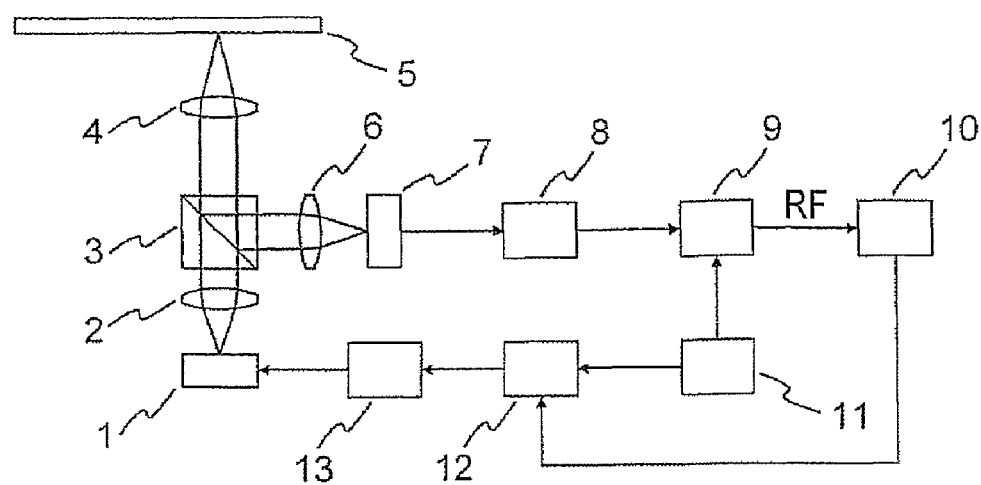
FIG. 1 shows a device for reading and/or writing to optical storage media which uses a scanner according to the invention.

FIG. 1 shows a device for reading and/or writing to optical storage media which uses a scanner according to the invention. A laser diode 1 emits a light beam that is collimated by a collimator lens 2, passes through a beam splitter cube 3 and is focused onto an optical storage medium 5 by an objective lens 4. The light beam reflected from the optical storage medium 5 is collimated by the objective lens and deflected by the beam splitter cube 3 in the direction of a further objective lens 6, which focuses it onto a photodetector 7. The photodetector 7 generates an analog data signal that is amplified by an amplifier 8 and converted into a digital data signal RF by an analog-to-digital converter 9. The digital data signal RF thus obtained is fed to a digital signal processor (DSP) 10 for further processing.

In order to reduce the noise on account of mode hops, the laser diode 1 is modulated by a radio-frequency modulator 13. In this case, the frequency and phase of the modulation are influenced by the digital signal processor (DSP) 10 by way of a frequency generator 12 with phase shifter. In order to ensure that the laser diode 1 is always switched on when a sampling operation is carried out by the analog-to-digital converter 9, the analog-to-digital converter 9 and the frequency generator 12 and thus also the radio-frequency modulator 13 are synchronized by means of a sampling clock generator 11.

Figure 2:
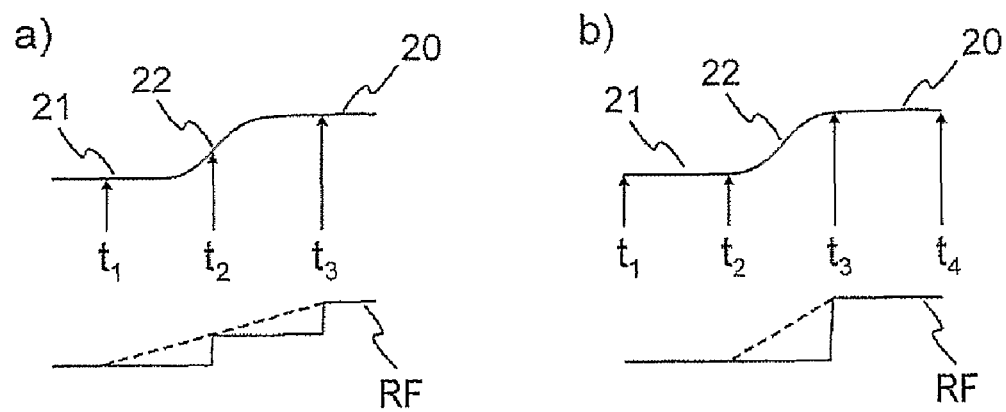
FIG. 2 shows the steepening of a signal edge as a result of the synchronization of pulses of a light source with the data markings on the storage medium.

FIG. 2 illustrates how a steepening of the signal edges is achieved as a result of the synchronization of pulses of the laser diode 1 with the data marks on the optical storage medium 5. FIG. 2a) here shows the case of non-synchronized pulses, and FIG. 2b) shows the case of synchronized pulses. Data in the form of marks 20 and spaces 21 are stored on the optical storage medium 5. For the sake of simplicity, the marks 20 are indicated in the form of elevations in FIG. 2. It is furthermore assumed that the spaces 21 do not reflect any light, while the marks completely reflect the light. The actual conditions depend on the storage medium 5 used or the type of recording, but are unimportant for the principle of edge steepening. Situated between the marks 20 and spaces 21 is a transition region 22, which is unavoidable on account of inadequacies in the data recording. If the data stored on the storage medium 5 are then read out with non-synchronized light pulses at the times $t_1$, $t_2$ and $t_3$, as illustrated in FIG. 2a), the light pulse, at the instant $t_2$, falls precisely in the transition region 22 in which the pulse is only partly reflected. In the digital data signal RF obtained by the synchronized sampling of the analog data signal at the times $t_1$ to $t_3$, this becomes apparent by virtue of the fact that the transition between "0" and "1" takes place in two clock cycles. The resulting signal edge is indicated by the dashed line. In the case where the stored data are read out with synchronized light pulses, as illustrated in FIG. 2b), by contrast, it is ensured that light pulses do not fall in the transition region 22 at any time $t_1$ to $t_4$, rather all light pulses impinge either on spaces 21 or marks 20. The transition between "0" and "1" correspondingly takes place in one clock cycle, which results in a significantly steeper edge. This is again indicated by the dashed line.

Figure 3:
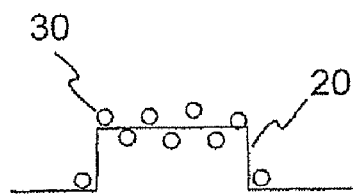
FIG. 3 shows the sampling of the data markings with a plurality of pulses.

A further improvement of the signal-to-noise ratio is obtained if the data marks 20 are read out with a plurality of light pulses 30 and the average value of the associated samples is formed. This is illustrated in FIG. 3. A mark 20 is read out by means of a series of light pulses 30. In the figure, the samples associated with the light pulses 30 are symbolized by the vertical position of the light pulses 30. Fluctuations of the laser power and also inadequacies of the optical storage medium 5 or of the sampling operation give rise to fluctuations of the samples, which are reduced by averaging over a plurality of samples.

The invention claimed is:

1. Optical scanner having a light source for generating a light beam for reading out data stored on an optical storage medium, the light source being modulated by a radio-frequency modulator to induce fast mode hopping, and having an analog-to-digital converter, which converts an analog data signal generated by a photodetector into a digital data signal, wherein the radio-frequency modulator and the analog-to-digital converter are synchronized.

2. Optical scanner according to claim 1, wherein the light source is pulsed by the radio-frequency modulator.

3. Optical scanner according to claim 1, wherein the radio-frequency modulator has a modulation frequency that is comparable with a sampling frequency of the analog-to-digital converter.

4. Optical scanner according to claim 1, wherein a phase shifter is provided, which influences a phase of the radio-frequency modulator relative to marks situated on the optical recording medium.

5. Optical scanner according to claim 4, wherein the phase of the radio-frequency modulator is influenced in such a way that transitions between marks and spaces in each case lie between two pulses of the light source.

6. Optical scanner according to claim 4, wherein the phase shifter is controlled by a microprocessor.

7. Optical scanner according to claim 1, wherein at least one of the analog data signal and the digital data signal is obtained by averaging signals obtained from two or more pulses of the light source.

8. Optical scanner according to claim 2, wherein the radio-frequency modulator has a modulation frequency that is comparable with a sampling frequency of the analog-to-digital converter.

9. Optical scanner according to claim 2, wherein a phase shifter is provided, which influences a phase of the radio-frequency modulator relative to marks situated on the optical recording medium.

10. Optical scanner according to claim 3, wherein a phase shifter is provided, which influences a phase of the radio-frequency modulator relative to marks situated on the optical recording medium.

11. Optical scanner according to claim 5, wherein the phase shifter is controlled by a microprocessor.

12. Optical scanner according to claim 2, wherein at least one of the analog data signal and the digital data signal is obtained by averaging signals obtained from two or more pulses of the light source.

13. Optical scanner according to claim 3, wherein at least one of the analog data signal and the digital data signal is obtained by averaging signals obtained from two or more pulses of the light source.

14. Optical scanner according to claim 4, wherein at least one of the analog data signal and the digital data signal is obtained by averaging signals obtained from two or more pulses of the light source.

15. Optical scanner according to claim 5, wherein at least one of the analog data signal and the digital data signal is obtained by averaging signals obtained from two or more pulses of the light source.

16. Optical scanner according to claim 6, wherein at least one of the analog data signal and the digital data signal is obtained by averaging signals obtained from two or more pulses of the light source.

17. Device for at least one of reading from and writing to optical recording media, having an optical scanner according to claim 1.

18. Device for at least one of reading from and writing to optical recording media, having an optical scanner according to claim 2.

19. Device for at least one of reading from and writing to optical recording media, having an optical scanner according to claim 4.

20. Device for at least one of reading from and writing to optical recording media, having an optical scanner according to claim 7.

* * * * *